(12) United States Patent
Lee

(10) Patent No.: US 11,730,320 B2
(45) Date of Patent: Aug. 22, 2023

(54) FOOD STRAINING AND DRYING APPARATUS

(71) Applicant: Schuyler Lee, Arlington, VA (US)

(72) Inventor: Schuyler Lee, Arlington, VA (US)

( * ) Notice: Subject to any disclaimer, the term of this patent is extended or adjusted under 35 U.S.C. 154(b) by 193 days.

(21) Appl. No.: 17/502,626

(22) Filed: Oct. 15, 2021

(65) Prior Publication Data

US 2022/0395141 A1 Dec. 15, 2022

Related U.S. Application Data

(60) Provisional application No. 63/210,849, filed on Jun. 15, 2021.

(51) Int. Cl.
*A47J 43/24* (2006.01)
*D06F 57/08* (2006.01)

(52) U.S. Cl.
CPC .............. *A47J 43/24* (2013.01); *D06F 57/08* (2013.01)

(58) Field of Classification Search
CPC ................. A47J 43/24; D06F 57/08

USPC .......................................... 99/495
See application file for complete search history.

(56) References Cited

U.S. PATENT DOCUMENTS

| 7,448,315 | B2 | 11/2008 | Mulhauser et al. |
| 9,027,471 | B2 | 5/2015 | Chan et al. |
| 10,767,928 | B1* | 9/2020 | Visit .......................... F26B 5/16 |
| 2013/0071047 | A1* | 3/2013 | VanLoocke ............ B65D 33/16 53/469 |
| 2017/0360258 | A1 | 12/2017 | Haggar et al. |

* cited by examiner

*Primary Examiner* — Dana Ross
*Assistant Examiner* — Joseph W Iskra
(74) *Attorney, Agent, or Firm* — Patrick Stanzione; Stanzione & Associates, PLLC

(57) ABSTRACT

A foldable straining and drying apparatus including a first hollow elongated flexible bag including a first open end, a channel formed about a middle section thereof with a collapsible ring formed within the channel and a perforated portion originating adjacent to the channel, and a second bag having an open end detachably attached to a middle section of the perforated portion of the first bag such that the perforated portion remains separated from a bottom of the second bag when the first hollow elongated flexible bag is held up in the air.

20 Claims, 3 Drawing Sheets

FOOD STRAINING AND DRYING APPARATUS

CROSS-REFERENCE TO RELATED APPLICATIONS

The present invention claims the benefit of priority to U.S. Provisional Patent Application Ser. No. 63/210,849 filed on Jun. 15, 2021, the entire disclosure of which is hereby incorporated herein in its entirety.

STATEMENT REGARDING FEDERALLY SPONSORED RESEARCH OR DEVELOPMENT

Not applicable.

COPYRIGHT NOTICE

A portion of this disclosure contains material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever. 37 C.F.R 1.71(d).

BACKGROUND OF THE INVENTIVE CONCEPT

1. Field of the Invention

The present inventive concept relates to a new and improved apparatus for drying wet (e.g., pre-washed) food items such as salads, fruits, vegetables, beans, and the like. The present inventive concept also relates to a new and improved apparatus for drying wet fabrics, such as clothing and the like. The present inventive concept also relates to a new and improved apparatus for straining food preparations, such as food mixtures, etc.

2. Description of the Related Art

Traditionally, in food preparation, when an article of food has excessive moisture on the surface of the food, such as after the food has been pre-washed, one would manually dry the food by patting a cloth on the wet surface of the food to remove the liquid and/or moisture. The manual contact with a surface of the cloth to the damp surface of the food will transfer the liquid and/or moisture to the cloth. This process can be especially burdensome in certain applications, such as, or example, during salad preparation or during the drying of herbs, where there are many pieces of such foods and especially when each piece of such foods has a large surface area. The process of drying each leaf of lettuce or bunches of herbs according such a method can be tedious and time consuming, as well as requiring a substantial amount of space to spread out the food items to dry.

Conventional solutions for drying food items such as fruits and vegetables can include salad spinners and the like which consist of an outer plastic container with solid walls, an inner removable plastic basket with perforated walls for throwing liquid from the surface of pre-washed fruits and/or vegetables by using a centrifugal force, and also generally include a lid with a mechanically operated hand crank or other push button member, or the like, which is placed over the plastic container. Most implementations of such devices are large, bulky, and require a significant amount of space for cleaning and storage. In addition, such devices are prone to wobble during an operation of spinning as a result load imbalances, are fragile and therefore can break easily. Once one of the parts of such devices break, the broken parts are difficult to fix or replace, causing the entire unit to be replaced, which becomes costly. Furthermore, the broken parts must be disposed of, which causes a huge amount of plastic pollution to the environment when thrown away. Other systems include a drainage device such as net, basket, or mesh which water can pass through, which require time for the moisture to naturally fall off of the food, which is ineffective for time sensitive food preparation. Other systems include only a carrier made of a net or mesh material that can hold items to be washed under a sink and allow water to pass through the carrier, but such solutions allow residual water to drip or splatter from the net or mesh carrier once removed from the sink.

U.S. Pat. No. 10,767,928 by Visit discloses a food drying apparatus 10 including a drying body 18, an absorbent layer 12 and a waterproof layer 14. Corners 22 of the drying body 18 include handles 20a-20d attached thereto for gripping and swinging the drying apparatus 10 in circles. In this patent all of the water and moisture remain inside the drying apparatus 10, which results in a heavy object for swinging as well as an inefficient way of removing water and moisture from the food product.

U.S. Pat. No. 9,027,471 by Chan et al. discloses a food drying device 100 including a container 400, a drying assembly 300 having a plurality of bores, and a drive mechanism 200. The drying assembly 300 is capable of being rotated relative to the container by a reciprocating handle 202 which drives the drive mechanism. This patent includes a plurality of large solid parts as well as a plurality of mechanical moving gears and parts. Often when the drying assembly 300 is rotated, wobbling results due to an uneven placement of the food, which causes damage to the parts of the device 100. Further, full size leaves, such as lettuce leaves, cannot sufficiently fit in such circular containers and dry properly since these full-size lettuce leaves must lie on their sides and spin around in a circle while remaining in a cupped position, tending to retain water therein instead of releasing the water. In addition, whole elongated vegetables, such as carrots, eggplants, etc. cannot easily fit into such circular devices.

U.S. Pat. No. 7,448,315 by Mulhauser et al. discloses a salad spinning device 20 with separable lid 24, perforated basket 26 and bowl 22. This device 20 requires a user to push down on a drive assembly 30 built into the lid 24 to cause the perforated basket 26 to spin. Similar to Chan et al., this salad spinning device 20 includes a plurality of large solid parts as well as a plurality of mechanical moving parts, which are prone to braking, which can be costly to replace. Often when the drying assembly 30 is rotated, wobbling results due to an uneven placement of the food, which causes damage to the parts of the device 20. Similar to U.S. Pat. No. 9,027,471 by Chan et al., in this device full-size lettuce and other leaves must lie on their sides and spin around in a circle while remaining in a cupped position, tending to retain water therein instead of releasing the water. In addition, whole elongated vegetables, such as carrots, eggplants, etc. cannot easily fit into such circular devices.

US Publication No.: 2017/0360258 by Haggar et al. discloses another spinner device which includes a circular solid outer container 2, solid base 40, and a lid 8. An actuation lever 10 is disposed in a recess in the lid 8. The lever 10 is connected to an arm 9, a slider 11, a pinion wheel 13 and an externally toothed actuating wheel 15. This patent also includes a plurality of large solid parts as well as a plurality of mechanical moving gears and parts. Often when the base 40 is rotated, wobbling results due to an uneven placement of the food, which causes damage to the parts of the device. Similar to U.S. Pat. No. 9,027,471 by Chan et al., in this device full-size lettuce and other leaves must lie on their sides and spin around in a circle while remaining in a cupped position, tending to retain water therein instead of releasing the water. In addition, whole elongated vegetables, such as carrots, eggplants, etc. cannot easily fit into such circular devices.

Accordingly, there is a need for a food drying apparatus that can be easily folded up and stored away while taking very little storage space.

There is also a need for a food drying apparatus that does not include a plurality of bulky solid breakable parts which cause environmental harm when disposed of due to damage thereof.

There is also a need for a food drying apparatus that does not require a plurality of mechanical moving parts that can malfunction and/or break.

There is also a need for a food drying apparatus that is constructed of a flexible material that is modular in design such that few separate parts can be easily repaired or replaced.

There is also a need for a food straining apparatus that can easily strain food mixtures to separate solids thereof from liquids thereof while retaining both the solids and liquids for use thereafter.

There is also a need for a food drying apparatus that is extended in length such that full size lettuce and other eatable leaves can be placed therein and spun dry in an extended form such that water can slide off the leaves in an efficient way to ensure that the leaves can be fully dried.

There is also a need for a food drying apparatus that is extended in length such that whole elongated vegetables can easily fit therein and spun dry.

SUMMARY OF THE INVENTIVE CONCEPT

The present general inventive concept provides a new and improved apparatus for drying wet (e.g., pre-washed) food items such as lettuce, fruits, vegetables, beans, and the like. The present inventive concept also relates to a new and improved apparatus for drying wet fabrics, such as clothing and the like. The present inventive concept also relates to a new and improved apparatus for straining food preparations, such as food mixtures, etc.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a food drying and straining apparatus, comprising: a first bag that can include: a flexible non-absorbent handle portion having an elongated hollow shape with a first open end and a second open end, the second open end including a channel surrounding an entire circumference thereof; a flexible ring member the can be disposed within the channel; an elongated non-absorbent mesh netting portion extending from the channel and ending at a closed end thereof, the mesh netting portion can include at least one detachable attachment device connected approximately at a middle section along an outer circumference thereof; and a non-absorbent second bag that can include an outer circumference defining a first open end and an opposite second closed end, the outer circumference including at least one detachable attachment device connected thereto that is attachable to the at least one detachable attachment device of the mesh netting portion such that when the closed end of the mesh netting portion is inserted into the first open end thereof and the at least one detachable attachment device connected to the outer circumference thereof is attached to the corresponding at least one detachable attachment device of the mesh netting portion the second end of the mesh netting portion rests above and separate from the second closed end thereof.

In an exemplary embodiment, the at least one detachable attachment device of the mesh netting portion can include a respective female or male attachment portion and the at least one detachable attachment device of the second bag includes a respective other one of the female or male attachment portion.

In another exemplary embodiment, the at least one detachable attachment device of the mesh netting portion and the at least one detachable attachment device of the second bag each can include three equally spaced apart detachable attachment devices.

In another exemplary embodiment, the apparatus can also include a pouch attached to the first open end of the handle portion to receive the entire food drying and straining apparatus therein after the flexible ring member is twisted and collapsed into a smaller ring.

In still another exemplary embodiment, the pouch may include a channel formed around the first open end and a drawstring inserted in a channel to draw the open end thereof closed.

In still another exemplary embodiment, the female attachment portion and the male attachment portion of the respective at least one detachable attachment device each may include a patch attached thereto, wherein the patch with the female attachment portion is connected to the mesh netting portion or the second bag and the patch with the male attachment portion is connected to the other one of the mesh netting portion or the second bag.

In still another exemplary embodiment, the first bag and the second bag are formed of a synthetic fabric material.

In yet another exemplary embodiment, the second bag is formed with a spout shape at one side thereof to control pouring out captured liquid.

In yet another exemplary embodiment, the non-absorbent mesh netting portion is tapered inward toward the second end.

The foregoing and/or other features and utilities of the present general inventive concept may also be achieved by providing a food drying and straining apparatus, comprising: a first bag formed of a flexible non-absorbent material that can include a first open end, a second closed end, and a perforated portion extending from approximately a middle section thereof to the second closed end to allow liquids to escape therefrom, the perforated portion including at least one detachable attachment device connected approximately at a middle section thereof; and a second bag that can include a first open end and a second closed end, the first open end including at least one detachable attachment device extending therefrom and configured to be attachable to a corresponding at least one detachable attachment device of the first bag such that when the closed end of the first bag is inserted into the first open end thereof and the at least one detachable attachment device thereof is attached to the corresponding at least one detachable attachment device of first bag the second end of the first bag rests above and separate from the second closed end thereof.

In an exemplary embodiment, the apparatus can further include a collapsible ring fixed around an inner circumference of the first bag at the middle section thereof adjacent the perforated portion, the ring being configured to be collapsible into a smaller ring when twisted.

In another exemplary embodiment, the first bag can further include a pouch attached to the first open end thereof, the pouch being configured to receive the collapsed ring and the first and second bags therein.

In still another exemplary embodiment, the closed end of the first bag is tapered inward to fit into the open end of the second bag without touching sides thereof.

In still another exemplary embodiment, the at least one detachable attachment device of the perforated portion and the at least one detachable attachment device of the second bag can each include at least two detachable attachment devices equally spaced around respective circumferences thereof.

The foregoing and/or other features and utilities of the present general inventive concept may also be achieved by providing a foldable straining and drying apparatus comprising: a first bag that can include: an elongated hollow handle portion including a first open end and a second open end, the second open end including a channel formed entirely around a circumference thereof; a collapsible ring inserted within the channel; and an elongated hollow perforated portion extending at a first end thereof from the second end of the elongated hollow handle portion and including a second closed perforated end opposite the first end; and a second bag that can include an open end and a closed end, wherein a periphery of the open end is attached to a middle section of the elongated hollow perforated portion such that the elongated hollow perforated portion remains separated from the closed end thereof when the foldable straining and drying apparatus is held up in the air by the elongated hollow handle portion.

In an exemplary embodiment, the elongated hollow handle portion further includes a pouch connected to the first open end, the pouch being configured to receive the entire apparatus and ring therein after the ring is collapsed into a smaller size ring.

In still another exemplary embodiment, the first and second bags can be formed of a non-absorbent synthetic fabric material.

In still another exemplary embodiment, the first and second bags can be formed of a non-absorbent woven cloth or perforated plastic film or an eco-friendly PUL fabric.

In still another exemplary embodiment, the first bag is elongated in length to receive therein whole leaves and elongated vegetables.

In yet another exemplary embodiment, the second bag is attached to the middle section of the elongated hollow perforated portion by at least one detachable device.

BRIEF DESCRIPTION OF THE DRAWINGS

These and/or other features and utilities of the present inventive concept will become apparent and more readily appreciated from the following description of the embodiments, taken in conjunction with the accompanying drawings of which.

Figure 1:
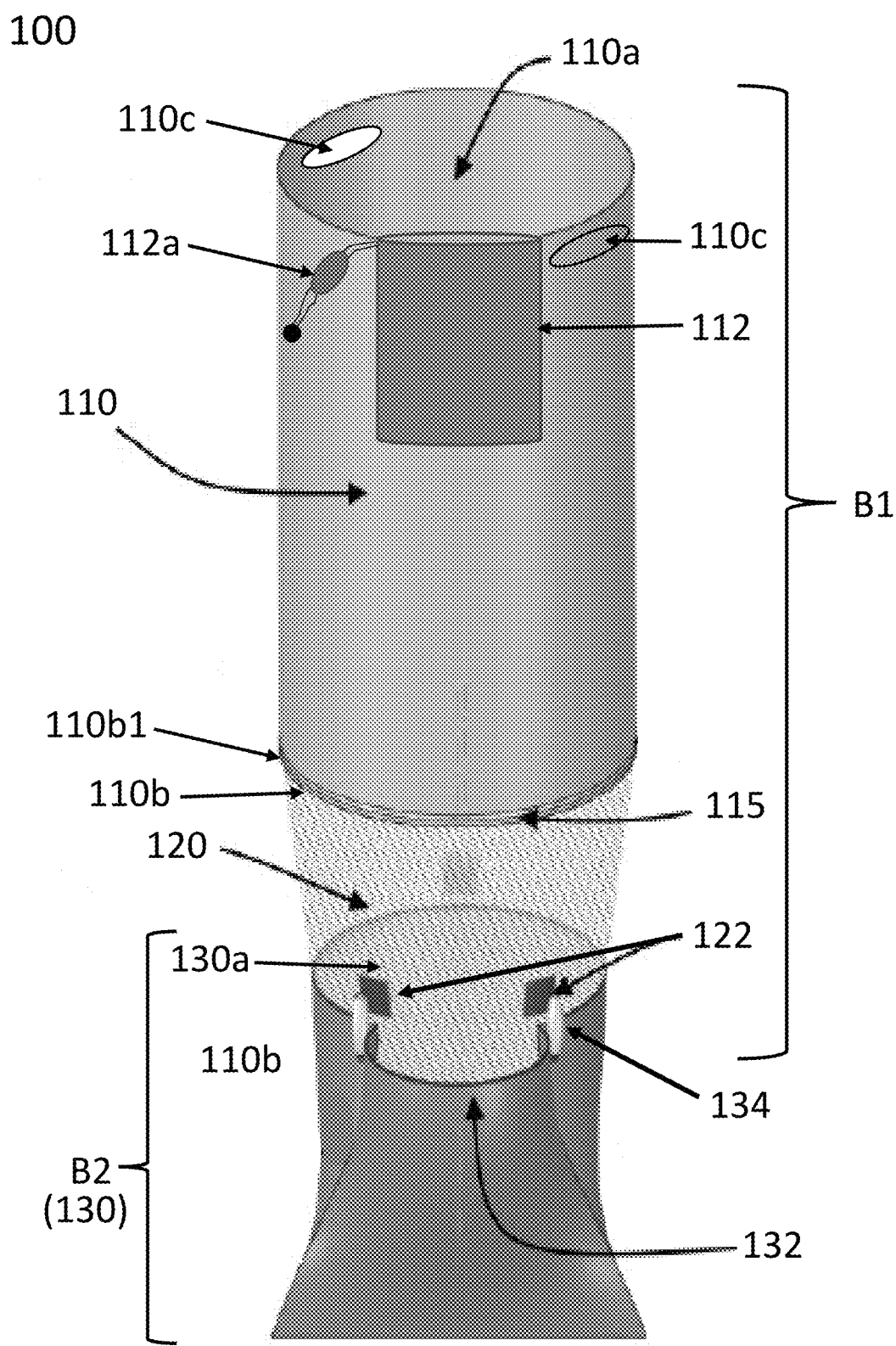
FIG. 1 illustrates a front view of a straining and drying apparatus according to an example embodiment of the present inventive concept.

The drawings illustrate a few exemplary embodiments of the present inventive concept, and are not to be considered limiting in its scope, as the overall inventive concept may admit to other equally effective embodiments. The elements and features shown in the drawings are to scale and attempt to clearly illustrate the principles of exemplary embodiments of the present inventive concept. In the drawings, reference numerals designate like or corresponding, but not necessarily identical, elements throughout the several views.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures. Also, while describing the present general inventive concept, detailed descriptions about related well-known functions or configurations that may diminish the clarity of the points of the present general inventive concept are omitted.

It will be understood that although the terms "first" and "second" may be used herein to describe various elements, these elements should not be limited by these terms. These terms are only used to distinguish one element from another element. Thus, a first element could be termed a second element, and similarly, a second element may be termed a first element without departing from the teachings of this disclosure.

Expressions such as "at least one of," when preceding a list of elements, modify the entire list of elements and do not modify the individual elements of the list.

All terms including descriptive or technical terms which are used herein should be construed as having meanings that are obvious to one of ordinary skill in the art. However, the terms may have different meanings according to the intention of one of ordinary skill in the art, case precedents, or the appearance of new technologies. Also, some terms may be arbitrarily selected by the applicant, and in this case, the meaning of the selected terms will be described in detail in the detailed description provided below. Thus, the terms used herein have to be defined based on the meaning of the terms together with the description throughout the specification.

Also, when a part "includes" or "comprises" an element, unless there is a particular description contrary thereto, the part can further include other elements, not excluding the other elements. In the following description, terms such as "unit" and "part" indicate a unit to process at least one function or operation among a plurality of functions or operations.

Hereinafter, one or more exemplary embodiments of the present general inventive concept will be described in detail with reference to accompanying drawings.

FIG. 1 illustrates a food separating and straining apparatus 100 according to an example embodiment of the present inventive concept. Referring to FIG. 1, the food separating and straining apparatus 100 can include a first bag B1 and a second bag B2. The first bag B1 can include a handle portion 110 and a mesh netting portion 120. The first bag B1 can be made of a flexible non-absorbent cloth material, such as, for example a polyester material. However, the first bag B1 can be made from any one of various types of materials which can twist sufficiently to be held in one hand as a handle and can withstand a centrifugal pulling force applied thereto when spinning the entire food separating and straining apparatus 100 in a circular motion. As pointed out above, the first bag B1 is preferably made from a material which is non-absorbent of liquids.

The handle portion 110 of the first bag B1 can include a pair of openings 110c that can act as handles for hanging the food drying and straining apparatus 100 for long periods of time to allow a controlled straining of liquids from solid foods, as well as for holding the first bag B1 while spinning the entire food separating and straining apparatus 100 to remove liquids from contents within the first bag B1.

The first bag B1 is preferably elongated in shape and is open at a first end 110a. Alternatively, the first bag B1 can be of another shape which will perform the intended operations as described herein. For example, the first bag B1 can have a first end 110a that is shaped to accommodate a zipper or Velcro® strip to close the first end 110a. It is to be noted that other various shapes of the first bag B1 which perform the intended operations as described herein are considered equivalents, and do not depart from the spirit and scope of the present inventive concept, as described herein.

The handle portion 110 of the first bag B1 can include a second end 110b which can include a channel 110b1 formed around an entire circumference thereof. The channel 110b1 can be formed by sewing additional material entirely around the interior circumference of the second end 110b of the handle portion 110. It is to be noted that other methods of forming the channel 110b1 can be used which provide the intended purpose as described herein. The channel 110b1 is provided to retain a flexible collapsible ring 115, or similar member, around the circumference of approximately a middle section of the first bag B1. In turn, the ring 115 is provided to support the middle section of the first bag B1 to remain expanded, and at the same time the ring 115 is configured to be collapsible when twisted to fold up together with the entire a food separating and straining apparatus 100, in order to be stored in a small storage space.

Figure 2A:
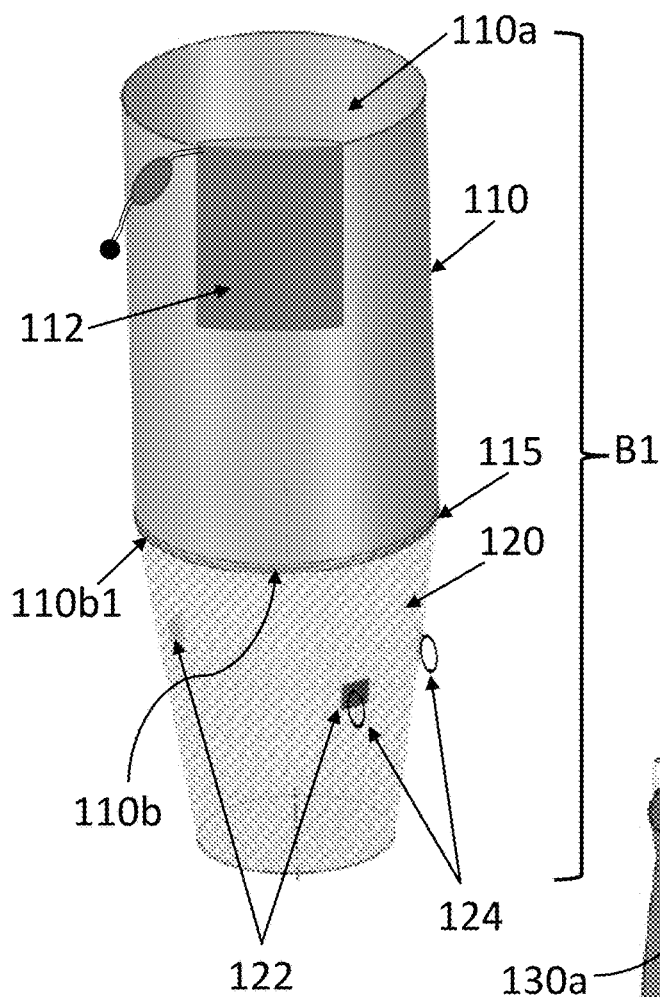
FIG. 2A illustrates a front view of a first bag including a handle portion and a mesh netting portion of the straining and drying apparatus according to the example embodiment of FIG. 1.
Figure 2B:
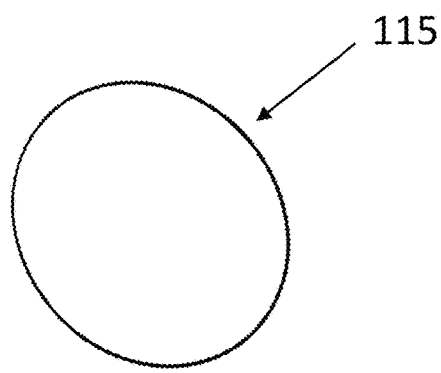
FIG. 2B illustrates a collapsible ring that is inserted into the first bag of the straining and drying apparatus according to the example embodiments of FIG. 1 and FIG. 2A.

Referring to FIG. 2B, the ring 115 can be made from a flexible collapsible steel wire, similar to a flexible collapsible wire that is used in car windshield shades, or a similar type of collapsible member, such as a spring. The ring 115, being secured within the channel 110b1, provides for maintaining an approximate middle section of the first bag B1 in an expanded position in which food or other objects can easily pass through, yet the ring 115 can be collapsed together with the first bag B1 by twisting the ring 115 at opposite sides thereof with two hands until both hands meet. The ring 115 is configured to collapse on itself into a smaller ring shape. Although the ring 115 is described to be formed of a flexible collapsible steel wire ring, the ring 115 can be formed of other materials which will provide the intended purposes as described herein without departing from the spirit and scope of the general inventive concept.

Referring to FIGS. 1 and 2A, the handle portion 110 of the first bag B1 can also include a pouch 112 attached thereto. The pouch can include an opening at one end thereof. A portion of the opening of the pouch 112 can be connected to a portion of the outer circumference of the opening 110a of the handle portion 110 of the first bag B1. The pouch 112 is configured to be of a size large enough to receive the entire food straining and drying apparatus 100 therein, including the collapsed ring 115, when the ring 115 is collapsed, as will be described in more detail below. The pouch can also include a drawstring and locking device combination 112a to close the opening in the pouch 112 in order to retain the ring 115 and a food separating and straining apparatus 100 therein when being stored away in a small space.

Still referring to FIGS. 1 and 2A, as pointed out above, the first bag B1 can also include the elongated mesh netting portion 120 as an integral part of the handle portion 110, but includes perforations. The elongated mesh netting portion 120 of the first bag B1 can include a first end 120a and an opposite second end 120b. The first end 120a of the mesh netting portion 120 of the first bag B1 is preferably an integral extension of the bottom end 110b of the handle portion 110, and therefore will also be expanded due to position of the ring 115. The perforations that define the elongated mesh netting portion 120 of the bag B1 generally will begin at a point adjacent to the channel 110b1 such that food and other objects placed within the open first end 110a of the handle portion 110 of the first bag B1 can be inserted through the handle portion 110 and rest in the mesh netting portion 120 of the first bag B1. The second end 120b of the mesh netting portion 120 (also being the second end of the first bag B1) is preferably a closed end, yet perforated, thus catching any foods or other objects therein while straining out any liquids through the perforations of the mesh netting portion 210. The entire first bag B1 can be made from a single synthetic or plastic fiber material that is non-absorbent of liquids. However, the first bag B1 can be formed of any non-absorbent material which withstand centrifugal forces when spin around in the air by the handle portion 110 while allowing liquids to flow through the mesh netting portion 120.

Although the handle portion 110 and the mesh netting portion 120 of the first bag B1 are preferably made from one single material, in an alternative example embodiment, the mesh netting portion 120 and the handle portion 110 can be two separate parts that are attached together. In this example embodiment, the channel 110b1 can be formed at the lower end 110b of the handle portion 110 and the mesh netting portion 120 will be connected to the handle portion 110 at the channels 110b1, such that when the ring 115 within the channel 110b1 is twisted to be collapsed, the mesh netting portion 120 and the handle portion 110 will both fold up together with the ring 115.

The first bag B1 (a combined handle portion 110 and mesh netting portion 120) can vary in length depending on the intended use. For example, in an example embodiment, the first bag B1 can be approximately 53 cm in length such that whole lettuce, kale or other leaves, as well as whole elongated vegetables, can be received therein to be spin dried after being pre-washed. Whole lettuce and kale leaves are desirable in many situations, such as, for example when such leaves are used for food wraps. Thus, by having a length sufficient to insert whole leaves into the first bag B1, all water remaining on these pre-washed leaves will easily slide off the whole leaves when the first bag B1 and second bag B2 are spun together in a circular motion by the handle portion 110, therefore efficiently drying whole leaves. Similar benefits of this elongated first bag B1 apply for all types of elongated vegetables.

Figure 3A:
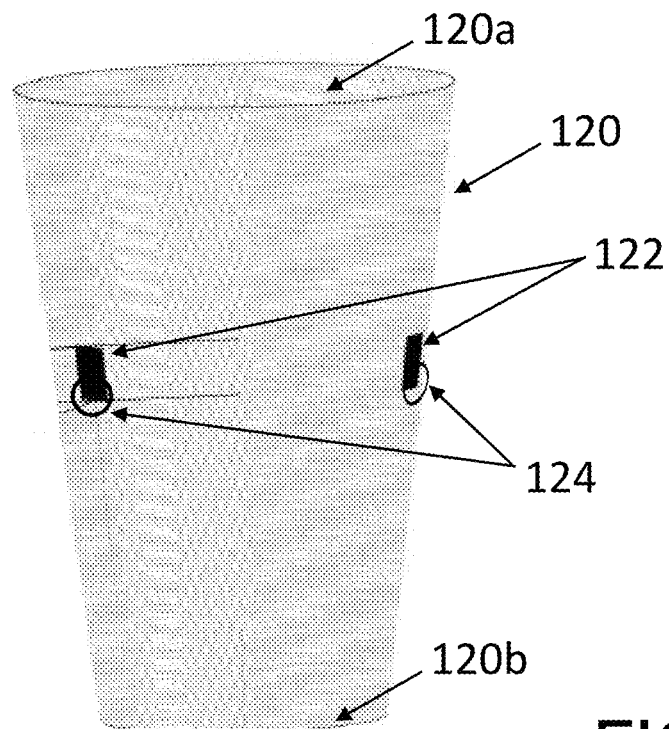
FIG. 3A illustrates a detailed view of the handle portion of the straining and drying apparatus according to the example embodiments of FIG. 1 and FIG. 2A.

Referring to FIGS. 2A and 3A, the mesh netting portion 120 of the first bag B1 can include two or more female attachments 122, 124 connected at the outer surface thereof at approximately a middle section thereof between the first end 120a and the second end 120b. The female attachments 122, 124 can each include a synthetic patch 122, such as a grosgrain ribbon, sewn to the middle outer section of the mesh netting portion 120, and a female connection portion, such as a fabric (i.e., semi-elastic) loop 124 can be used, which will engage with (i.e., receive therein) a corresponding male attachment device. As illustrated, each of the female attachments 122, 124 are connected to the mesh netting portion 120 at approximately the middle section thereof and are spaced apart from each other around the circumference of the mesh netting portion 120. It is to be noted that although a synthetic patch 122 and female portion of a circular fabric loop 124 are described as the female attachments in this example embodiment, other female attachment devices can be used which will provide the intended purposes as described herein. For example, instead of using a female portion of a circular fabric loop 124, a female portion of a plastic clip (not illustrated) can be used which will engage with a corresponding male portion of a plastic clip (not illustrated), as described below.

Figure 2C:
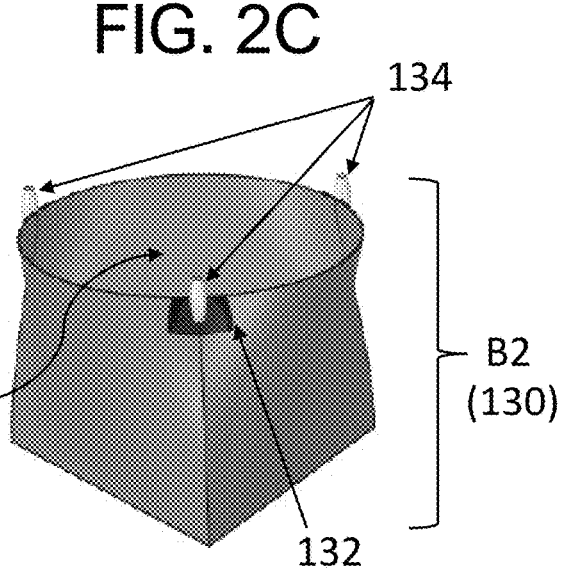
FIG. 2C illustrates a front view of a liquid catching second bag of the straining and drying apparatus according to the example embodiment of FIG. 1.

Referring to FIGS. 1 and 2C, the food separating and straining apparatus 100 can also include a second bag B2 (also referred to as 130). The second bag B2 includes an opening at a first end 130a and a closed opposite second end 130b. The second bag B2 can be configured to be of a depth to receive approximately half the length of the mesh netting portion 120 of the first bag B1 therein without the mesh netting portion 120 contacting the closed second end 130b of the second bag B2. The second bag B2 can be formed of a fiber or composite fabric, or a synthetic or plastic material which is non-absorbent of liquids. Preferably, the second bag B2 is formed of an eco-friendly polyurethane laminated (PUL) fabric, a Dyneema® composite fabric, or the like.

Figure 3B:
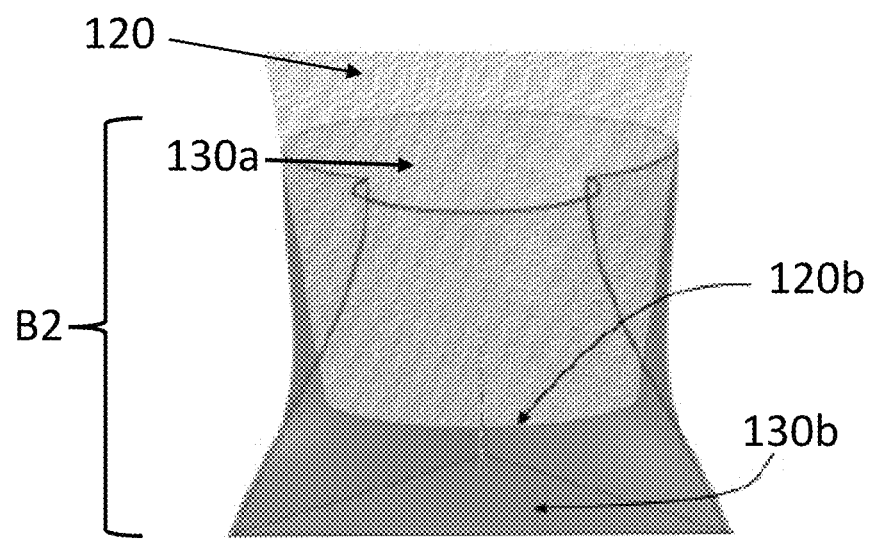
FIG. 3B illustrates a detailed view of the liquid catching second bag of the straining and drying apparatus in operation with the mesh netting portion, according to the example embodiment of FIG. 1.

As illustrated in FIG. 3B, the second bag B2 can include a spout 132 formed at one side thereof to provide for a controlled pouring out of any liquid captured therein from the mesh netting portion 120 of the first bag B1.

Referring back to FIGS. 1 and 2C, the circumference of the opening 130a of the second bag B2 can include two or more male attachments 132, 134 connected thereto. The male attachments can include a synthetic patch 132, such as a grosgrain ribbon, sewn around the circumference of the opening 130a, and a wooden peg 134 (i.e., a button toggle) connected at a middle portion, via a small cord, to the synthetic patch 132, wherein the wooden peg 134 can be inserted through the corresponding circular fabric loop 124 acting as the female attachment. It is to be noted that although a synthetic patch 132 and wooden peg 134 are described as male attachments according to this example embodiment, other male attachment devices can be used which will provide the intended purposes as described herein. For example, instead of using a wooden peg 134, a male portion of a plastic clip (not illustrated) can be attached to the synthetic patch 132, wherein the male portion of the plastic clip can be securely inserted into a corresponding female portion of a plastic clip, as described above with reference to the mesh netting portion 120. Although a female attachment portion is described to be attached to the mesh netting portion 120 while a male attachment portion is described to be attached to the second bag B2, the female attachment portion 122, 124 can alternatively be attached to the second bag B2 while the male attachment portion 132, 134 can alternatively be attached to the mesh netting portion 120 of the first bag B1.

It is submitted that equivalent alternatives to the above described female and male attachment devices can be used which will provide the intended purposes of detachably attaching the first bag B1 to the second bag B2 without departing from the sprit and scope of the present inventive concept. For example, a zipper or Velcro® strips can be attached to both the first bag B1 and second bag B2 to provide for a device that detachably attaches the first bag B1 and the second bag B2, or partially detaches the first bag B1 and the second bag B2 such that a portion of the first bag B1 and the second bag B2 are integrally formed together.

In the alternative example embodiments where either a zipper or Velcro® is used as detachable attachment devices, the spout 132 formed at one side of the second bag B2 can be disposed below the detachable attachment device connected to the second bag B2.

The number of male attachment portions 132, 134 connected around the circumference of the opening 130a of the second bag B2 should be the same as the number of female attachment portions 122, 124 connected around the middle section of the mesh netting portion 120 of the first bag B1, and should also be spaced at equal distances. In an example embodiment, three male attachment portions 132, 134 can be connected around the opening 130a of the second bag B2 and three female attachment portions 122, 124 can be connected around the middle section of the mesh netting portion 120 of the first bag B1, where the male attachment portions 132, 134 and female attachment portions 122, 124 are equally separated around the circumference of the opening 130a of the second bag B2 and the mesh netting portion 120, respectively.

Referring to FIGS. 1 and 3B, the second bag B2 can be connected to the mesh netting portion 120 of the first bag B1 by inserting the second end 120b of the mesh netting portion 120 into the opening 130a of the second bag B2 and then attaching the male attachments 132, 134 to corresponding ones of the female attachments 122, 124. Once the male attachments 132, 134 are attached to the corresponding female attachments 122, 124, the closed second end 120b of the mesh netting portion 120 of the first bag B1 should sit above and separated from the second end 130b of the second bag B2 by a distance that will keep any food or other objects resting at the second end 120b of the mesh netting portion 120 from coming into contact with any liquid captured at the second end 130b of the second bag B2. In an example embodiment, the mesh netting portion 120 of the first bag B1 can be tapered inward in shape such that the second closed end 120b of the mesh netting portion 120 can easily fit into the opening 130a of the second bag B2.

With the configuration of the first bag B1 being attached to the second bag B2, a user can simply insert any pre-washed food or other objects into the first bag B1. With the pre-washed food or other wet objects resting at the second end 120b of the mesh netting portion 120 of the first bag B1, a user can simply twist the first end 110a of the handle portion 110 closed to use as a handle and then swing the entire food straining and drying apparatus 100 (first bag B1 and second bag B2) around in a circular motion to create a centrifugal force on the foods or other objects therein, which will force all the water, or other liquid, away from the pre-washed food or other objects and into the second bag B2. When the food straining and drying apparatus 100 has been swinging in a circular motion for a time sufficient to remove all the liquid from the wet items contained therein, the first end 110a of the handle portion 110 can be opened and the dried or drained items can be removed from the food separating and straining apparatus 100, substantially free of surface water. The first bag B1 can then be separated from the second bag B2 by detaching the male attachments 132, 134 from the female attachments 122, 124, at which point both the first bag B1 and the second bag B2 can be hung to dry. After drying the first bag B1 and the second bag B2, the first bag B1 and the second bag B2 can be re-attached, and then the entire food separating and straining apparatus 100 can be folded up by twisting and collapsing the ring 115, at which point the entire food straining and drying apparatus 100 can be collapsed into a smaller size and fitted into the pouch 112 and locked therein using the drawstring and locking device combination 112a.

In addition to inserting foods in the food straining and drying apparatus 100, with the configuration of the first bag B1 being attached to the second bag B2, a user can simply insert any pre-mixes including both solids and liquids, which are intended to be separated, into the opening 110a of the handle portion 110. One example of a pre-mix intended to be separated is a mix of whey and clumps of curd cheese pieces that form ricotta cheese. Once the pre-mix is placed through the opening 110a of the handle portion 110, the handle portion 110 can be hung in the air by the openings 110c so that the second end 120b of the mesh netting portion 120 of the first bag B1 is separated from the second end 130b of the second bag B2. As a result, the whey from the ricotta cheese mixture will filter through the mesh netting portion 120 while curds of the ricotta cheese mixture will be captured in the mesh netting portion 120. The food straining and drying apparatus 100 can be hung as long as desired by the openings 110c in order to obtain either a more moist or more dry ricotta cheese product. The whey caught in the second bag B2 can then be poured out using the spout 132 to be used for other recipes, if desired.

As another benefit of the food straining and drying apparatus 100 disclosed herein, in an outdoor survival situation, it may be desirable to collect the water drained from vegetation after morning dew for consumption, where the water collected in the second bag B2 can be used for drinking purposes. In such cases, the food straining and drying apparatus 100 can be lifesaving.

Still another benefit of the food straining and drying apparatus 100 as described herein is that the length of the first bag B1 can be such that whole lettuce and other leaves can be fit therein lengthwise such that when the food straining and drying apparatus 100 is spun around by the handle portion 110 the water from the leaves can easily slide along the lengths thereof and into the second bag B2, thus ensuring that the leaves can be efficiently dried.

Still another benefit of the food straining and drying apparatus 100 as described herein is that the length of the first bag B1 can be of a length such that whole elongated vegetables, such as carrots, eggplants, etc., can be fit therein and spun around by the handle portion 110, thus ensuring that the whole elongated vegetables can be efficiently dried.

Various other benefits of the food straining and drying apparatus 100 disclosed herein can be achieved as desired.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A food drying and straining apparatus, comprising:
    a first bag including:
        a flexible non-absorbent handle portion having an elongated hollow shape with a first open end and a second open end, the second open end including a channel surrounding an entire circumference thereof;
        a flexible ring member disposed within the channel;
        an elongated non-absorbent mesh netting portion extending from the channel and ending at a closed end thereof, the mesh netting portion including at least one detachable attachment device connected approximately at a middle section along an outer circumference thereof; and
    a non-absorbent second bag having an outer circumference defining a first open end and an opposite second closed end, the outer circumference including at least one detachable attachment device connected thereto that is attachable to the at least one detachable attachment device of the mesh netting portion such that when the closed end of the mesh netting portion is inserted into the first open end thereof and the at least one detachable attachment device connected to the outer circumference thereof is attached to the corresponding at least one detachable attachment device of the mesh netting portion the second end of the mesh netting portion rests above and separate from the second closed end thereof.

2. The apparatus according to claim 1, wherein the at least one detachable attachment device of the mesh netting portion includes a respective female or male attachment portion and the at least one detachable attachment device of the second bag includes a respective other one of the female or male attachment portion.

3. The apparatus according to claim 2, wherein the at least one detachable attachment device of the mesh netting portion and the at least one detachable attachment device of the second bag each include three equally spaced apart detachable attachment devices.

4. The apparatus according to claim 1, further including:
    a pouch attached to the first open end of the handle portion to receive the entire food drying and straining apparatus therein after the flexible ring member is twisted and collapsed into a smaller ring.

5. The apparatus according to claim 4, wherein the pouch includes a channel formed around the first open end and a drawstring inserted in a channel to draw the open end thereof closed.

6. The apparatus according to claim 2, wherein the female attachment portion and the male attachment portion of the respective at least one detachable attachment device each include a patch attached thereto, wherein the patch with the female attachment portion is connected to the mesh netting portion or the second bag and the patch with the male attachment portion is connected to the other one of the mesh netting portion or the second bag.

7. The apparatus according to claim 1, wherein the first bag and the second bag are formed of a synthetic fabric material.

8. The apparatus according to claim 1, wherein the second bag is formed with a spout shape at one side thereof to control pouring out captured liquid.

9. The apparatus according to claim 1, wherein the non-absorbent mesh netting portion is tapered inward toward the second end.

10. A food drying and straining apparatus, comprising:
   a first bag formed of a flexible non-absorbent material including a first open end, a second closed end, and a perforated portion extending from approximately a middle section thereof to the second closed end to allow liquids to escape therefrom, the perforated portion including at least one detachable attachment device connected approximately at a middle section thereof; and
   a second bag including a first open end and a second closed end, the first open end including at least one detachable attachment device extending therefrom and configured to be attachable to a corresponding at least one detachable attachment device of the first bag such that when the closed end of the first bag is inserted into the first open end thereof and the at least one detachable attachment device thereof is attached to the corresponding at least one detachable attachment device of first bag the second end of the first bag rests above and separate from the second closed end thereof.

11. The apparatus according to claim 8, further comprising a collapsible ring fixed around an inner circumference of the first bag at the middle section thereof adjacent the perforated portion, the ring being configured to be collapsible into a smaller ring when twisted.

12. The apparatus according to claim 11, wherein the first bag further includes a pouch attached to the first open end thereof, the pouch being configured to receive the collapsed ring and the first and second bags therein.

13. The apparatus according to claim 10, wherein the closed end of the first bag is tapered inward to fit into the open end of the second bag without touching sides thereof.

14. The apparatus according to claim 10, wherein the at least one detachable attachment device of the perforated portion and the at least one detachable attachment device of the second bag each include at least two detachable attachment devices equally spaced around respective circumferences thereof.

15. A foldable straining and drying apparatus comprising:
   a first bag including:
      an elongated hollow handle portion including a first open end and a second open end, the second open end including a channel formed entirely around a circumference thereof;
      a collapsible ring inserted within the channel; and
      a elongated hollow perforated portion extending at a first end thereof from the second end of the elongated hollow handle portion and including a second closed perforated end opposite the first end; and
   a second bag having an open end and a closed end, wherein a periphery of the open end is attached to a middle section of the elongated hollow perforated portion such that the elongated hollow perforated portion remains separated from the closed end thereof when the foldable straining and drying apparatus is held up in the air by the elongated hollow handle portion.

16. The apparatus of claim 15, wherein the elongated hollow handle portion further includes a pouch connected to the first open end, the pouch being configured to receive the entire apparatus and ring therein after the ring is collapsed into a smaller size ring.

17. The apparatus of claim 15, wherein the first and second bags are formed of a non-absorbent synthetic fabric material.

18. The apparatus of claim 17, wherein the first and second bags are formed of a non-absorbent woven cloth or perforated plastic film or an eco-friendly PUL fabric.

19. The apparatus according to claim 17, wherein the first bag is elongated in length to receive therein whole leaves and elongated vegetables.

20. The apparatus of claim 15, wherein the second bag is attached to the middle section of the elongated hollow perforated portion by at least one detachable device.

* * * * *